(12) United States Patent
Chen et al.

(10) Patent No.: US 11,424,823 B2
(45) Date of Patent: Aug. 23, 2022

(54) TIME SLOT MULTIPLEXING METHOD AND APPARATUS, AND COMMUNICATION DEVICE

(71) Applicant: Hytera Communications Corporation Limited, Guangdong (CN)

(72) Inventors: Minmin Chen, Guangdong (CN); Linfeng An, Guangdong (CN); Bao Guan, Guangdong (CN); Qingxiang Yu, Guangdong (CN); Lei Li, Guangdong (CN)

(73) Assignee: Hytera Communications Corporation Limited, Guangdong (CN)

( * ) Notice: Subject to any disclaimer, the term of this patent is extended or adjusted under 35 U.S.C. 154(b) by 164 days.

(21) Appl. No.: 16/646,128

(22) PCT Filed: Sep. 11, 2017

(86) PCT No.: PCT/CN2017/101180
§ 371 (c)(1),
(2) Date: Mar. 10, 2020

(87) PCT Pub. No.: WO2019/047200
PCT Pub. Date: Mar. 14, 2019

(65) Prior Publication Data
US 2020/0220614 A1  Jul. 9, 2020

(51) Int. Cl.
*H04B 7/212* (2006.01)
*H04L 5/22* (2006.01)
(Continued)

(52) U.S. Cl.
CPC .............. *H04B 7/212* (2013.01); *H04L 5/22* (2013.01); *H04W 72/0446* (2013.01); *H04W 84/18* (2013.01)

(58) Field of Classification Search
CPC ......... H04B 7/22; H04L 5/22; H04W 72/0446
(Continued)

(56) References Cited

U.S. PATENT DOCUMENTS

| 6,950,418 B1 | 9/2005 | Young et al. |
| 2010/0046484 A1 | 2/2010 | Elliott |

(Continued)

FOREIGN PATENT DOCUMENTS

| CN | 103001888 A | 3/2013 |
| CN | 104684092 A | 6/2015 |

(Continued)

OTHER PUBLICATIONS

Chinese Office Action for Application No. 201710814346.9, dated Dec. 24, 2019.
(Continued)

*Primary Examiner* — Faisal Choudhury
(74) *Attorney, Agent, or Firm* — Wolf, Greenfield & Sacks, P.C.

(57) ABSTRACT

A method and an apparatus for time slot multiplexing, and a communication device. At least one multiplexing node group in a subnet of a TDMA communication system may be determined according to a connection relationship among all nodes in the subnet, where a shortest communication link between every two nodes in each multiplexing node group includes at least the preset quantity of nodes, the preset quantity of nodes includes the two nodes, and the preset quantity is no less than 4. For each multiplexing node group, a multiplexing time slot allocated to the multiplexing node group is determined, and each node in the multiplexing node group is controlled to transmit data in the multiplexing time slot. The time slots can be shared by the nodes in the multiplexing node group, and therefore multiple nodes can transmit data in the multiplexing time slot.

12 Claims, 4 Drawing Sheets

(51) Int. Cl.
*H04W 72/04* (2009.01)
*H04W 84/18* (2009.01)

(58) Field of Classification Search
USPC .......................................................... 370/329
See application file for complete search history.

(56) References Cited

U.S. PATENT DOCUMENTS

| | | | |
|---|---|---|---|
| 2011/0044169 A1* | 2/2011 | Liu ..................... | H04W 28/021 370/235 |
| 2013/0100942 A1* | 4/2013 | Rudnick .............. | H04B 7/2656 370/337 |
| 2020/0015212 A1* | 1/2020 | Lyu ....................... | H04L 5/0055 |

FOREIGN PATENT DOCUMENTS

| CN | 105636148 A | 6/2016 |
|---|---|---|
| CN | 105722241 A | 6/2016 |
| CN | 106231646 A | 12/2016 |
| CN | 107567101 A | 1/2018 |

OTHER PUBLICATIONS

PCT/CN2017/101180, May 3, 2018, International Search Report and Written Opinion.
CN201710814346.9, Dec. 24, 2019, First Office Action.
International Search Report and Written Opinion for International Application No. PCT/CN2017/101180, dated May 3, 2018.

\* cited by examiner

Determine at least one multiplexing node group in a subnet of a TDMA communication system, according to a connection relationship among all nodes in the subnet, where a shortest communication link between every two nodes in each multiplexing node group includes at least a preset quantity of nodes, the preset quantity of nodes includes said two nodes, and the preset quantity is not less than 4 ⸺S100

For each multiplexing node group, determine a multiplexing time slot allocated to said multiplexing node group, and control each node in said multiplexing node group to transmit data in the multiplexing time slot, where each node in said multiplexing node group is capable to transmit data at any moment in the multiplexing time slot ⸺S200

TIME SLOT MULTIPLEXING METHOD AND APPARATUS, AND COMMUNICATION DEVICE

CROSS REFERENCE OF RELATED APPLICATIONS

This Application is a national stage filing under 35 U.S.C. § 371 of International Patent Application Serial No. PCT/CN2017/101180, filed Sep. 11, 2017. The contents of this application are incorporated herein by reference in its entirety.

TECHNICAL FIELD

The present disclosure relates to the technical field of communications, and particularly, to a method and an apparatus for time slot multiplexing, and a communication device.

BACKGROUND

Figure 3:
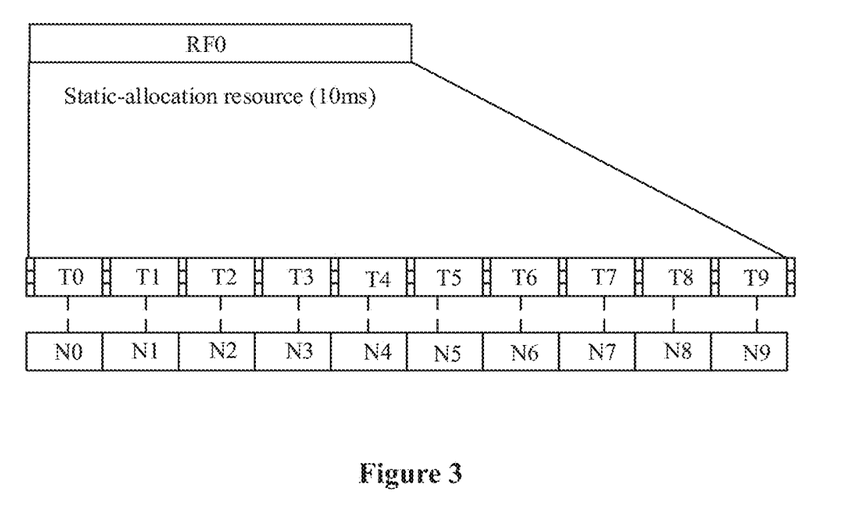
FIG. 3 is a schematic diagram of static allocation of time slots in conventional technology.

In a time division multiple access communication (TDMA) system, a frame in a physical layer of a wireless mesh (MESH) network has a length of 20 ms. The first 10 ms is fixed time slots allocated to each node, which is a static allocation. The last 10 ms may be time slots allocated to each node according to service requirements, which is a dynamic allocation. An example of the static allocation is shown in FIG. 3. In FIG. 3, RF0 is a static-allocation resource, that is, the first 10 ms of a frame in the physical layer. The static-allocation resource is divided into nine time slots, T0 to T9. T0 to T9 are allocated to nodes N0 to N9, respectively, as indicated by dashed lines. Each node transmits data only in the time slot that is allocated to said node, and does not transmit data in other time slots.

Figure 4:
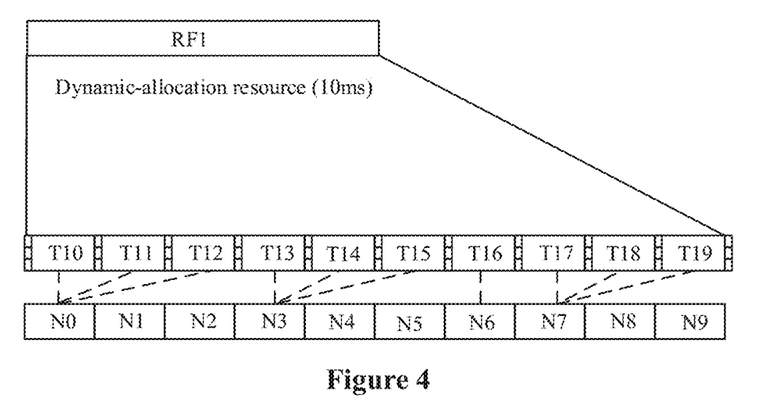
FIG. 4 is a schematic diagram of dynamic allocation of time slots in conventional technology.

An example of the dynamic allocation is shown in FIG. 4. In FIG. 4, RF1 is a dynamic-allocation resource, that is, the last 10 ms of a frame in the physical layer. The dynamic-allocation resource is divided into nine time slots, T10 to T19. T10 to 112 are allocated to the node N0. T13 to T15 are allocated to the node N3. T16 is allocated to the node NE, and T17 to T19 are allocated to the node N7, as indicated by dashed lines. Each node transmits data only in the time slot that is allocated to said node, and does not transmit data in other time slots.

Thereby, only one node can transmit data in each time slot, regardless of the static or dynamic allocation, in a conventional TDMA communication system. Resource utilization and spectral efficiency of the nodes are greatly reduced.

SUMMARY

An objective of embodiments of the present disclosure is to provide a method and an apparatus for time slot multiplexing, and a communication device, which improve resource utilization and spectral efficiency of nodes. Specific technical solutions are as follows:

A method for time slot multiplexing applied to a time division multiple access (TDMA) communication system is provided, including:

determining at least one multiplexing node group in a subnet of the TDMA communication system, according to a connection relationship among all nodes in the subnet, where a shortest communication link between every two nodes in each of the at least one multiplexing node group includes at least a preset quantity of nodes, the preset quantity of nodes includes said two nodes, and the preset quantity is no less than 4; and for each of the at least one multiplexing node group, determining a multiplexing time slot allocated to said multiplexing node group, and controlling each node in said multiplexing node group to transmit data in the multiplexing time slot, where each node in said multiplexing node group is capable to transmit data at any moment in the multiplexing time slot.

Optionally, the preset quantity is 6.

Optionally, determining the at least one multiplexing node group in the subnet of the TDMA communication system, according to the connection relationship among all nodes in the subnet, includes:

for every two nodes, determining whether said two nodes are adjacent according to the connection relationship among all nodes in the subnet of the TDMA communication system; determining whether there is a duplicate node both adjacent to a node adjacent to one of said two nodes and adjacent to a node adjacent to another of said two nodes, in response to said two nodes being not adjacent; and determining said two nodes are in one of the at least one multiplexing node group, in response to there being no duplicate node.

Optionally, the TDMA communication system is a Long Term Evolution (LTE) system, and determining the at least one multiplexing node group in the subnet of the TDMA communication system according to the connection relationship among all nodes in the subnet includes: determining the at least one multiplexing node group in the subnet, according to the connection relationship among all nodes in the subnet of a wireless mesh network of the LTE system.

Optionally, determining the multiplexing time slot allocated to said multiplexing node group includes:

determining time slots allocated to all nodes in said multiplexing node group, and determining a combination of all the determined time slots to be the multiplexing time slot.

An apparatus for time slot multiplexing, applied to a time division multiple access (TDMA) communication system, is provided, including a multiplexing-node determining unit and a time-slot allocating unit, where:

the multiplexing-node determining unit is configured to determine at least one multiplexing node group in a subnet of the TDMA communication system, according to a connection relationship among all nodes in the subnet, where a shortest communication link between every two nodes in each of the at least one multiplexing node group includes at least a preset quantity of nodes, the preset quantity of nodes includes said two nodes, and the preset quantity is no less than 4; and the time-slot allocating unit is configured to, for each of the at least one multiplexing node group, determine a multiplexing time slot allocated to said multiplexing node group, and control each node in said multiplexing node group to transmit data in the multiplexing time slot, where each node in said multiplexing node group is capable to transmit data at any moment in the multiplexing time slot.

Optionally, the preset quantity is 6.

Optionally, the multiplexing-node determining unit includes a first node determining unit and a second node determining unit, where:

the first node determining unit is configured to: for every two nodes, determine whether said two nodes are adjacent according to the connection relationship, and trigger the second node determining unit in response to said two nodes being not adjacent; and the second node determining unit is configured to determine whether there is a duplicate node both adjacent to a node adjacent to one of said two nodes and adjacent to a node adjacent to another of said two nodes, and determine that said two nodes are in one of the at least one multiplexing node group, in response to there being no duplicate node, where the shortest communication link between every two nodes in each of the at least one multiplexing node group includes at least the preset quantity of nodes, and the preset quantity of nodes includes said two nodes.

Optionally, the time-slot allocating unit is configured to:

for each of the at least one multiplexing node group, determine time slots allocated to all nodes in said multiplexing node group, and determine a combination of all the determined time slots to be the multiplexing time slot; and control each node in said multiplexing node group to transmit data in the multiplexing time slot, where each node in said multiplexing node group is capable to transmit data at any moment in the multiplexing time slot.

A communication device located in a time division multiple access communication (TDMA) system is provided, including:

a processor, a memory, a data receiver, and a data transmitter, where:

the data receiver is coupled to the processor, and configured to receive data transmitted in a communication link of the TDMA communication system;

the data transmitter is coupled to the processor, and configured to transmit data to the communication link of the TDMA communication system;

the memory is coupled to the processor, and configured to store a program and data generated when the program being executed; and the processor when executing the program in the memory is configured to:

determine at least one multiplexing node group in a subnet of the TDMA communication system, according to a connection relationship among all nodes in the subnet, where a shortest communication link between every two nodes in each of the at least one multiplexing node group includes at least a preset quantity of nodes, the preset quantity of nodes includes said two nodes, and the preset quantity is no less than 4; and for each of the at least one multiplexing node group, determine a multiplexing time slot allocated to said multiplexing node group, and control each node in said multiplexing node group to transmit data in the multiplexing time slot, where each node in said multiplexing node group is capable to transmit data at any moment in the multiplexing time slot.

Optionally, for every two nodes, the processor determines whether said two nodes are adjacent according to the connection relationship among all nodes in the subnet of the time division multiple access communication system; determines whether there is a duplicate node both adjacent to a node adjacent to one of said two nodes and adjacent to a node adjacent to another of said two nodes, in response to the two nodes being not adjacent; and determines said two nodes are in one of the at least one multiplexing node group, in response to there being no duplicate node.

Optionally, the processor determines time slots allocated to all nodes in said multiplexing node group, and determines a combination of all the determined time slots to be the multiplexing time slot.

The method and the apparatus for time slot multiplexing, and the communication device are provided according to embodiments of the present disclosure. The at least one multiplexing node group in the subnet of the TDMA communication system may be determined according to the connection relationship among all nodes in the subnet, where the shortest communication link between every two nodes in each of the at least one multiplexing node group includes at least the preset quantity of nodes, the preset quantity of nodes includes said two nodes, and the preset quantity is no less than 4. For each of the at least one multiplexing node group, the multiplexing time slot allocated to said multiplexing node group is determined, and each node in said multiplexing node group is controlled to transmit data in the multiplexing time slot, where each node in said multiplexing node group is capable to transmit data at any moment in the multiplexing time slot. The time slots can be shared by the nodes in the multiplexing node group, and therefore multiple nodes can transmit data in the multiplexing time slot. Resource utilization rate and spectral efficiency of the nodes are greatly improved. Further, the quantity of nodes is controlled in the shortest communication link between the nodes sharing a time slot, so that the time slot can only be shared when there is a long communication path between the two nodes. Thereby, signal interference among the nodes sharing the same time slot is reduced, ensuring an effect of communication.

It is appreciated that not all the above-mentioned advantages are necessary to be achieved at the same time for any product or method implementing the present disclosure.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION OF THE EMBODIMENTS

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figure 1:
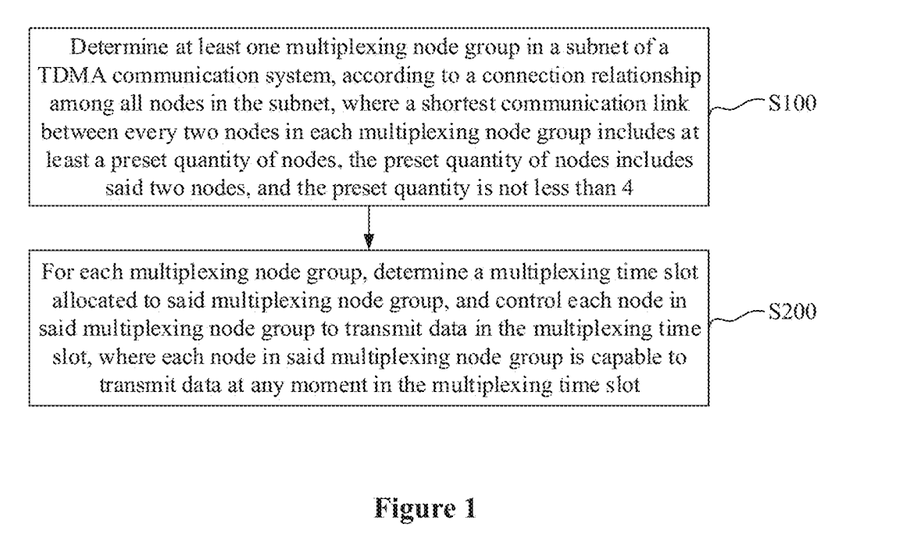
FIG. 1 is a flowchart of a method for time slot multiplexing according to an embodiment of the present disclosure.

As shown in FIG. 1, a method for time slot multiplexing is provided according to an embodiment of the present disclosure. The method is applied to a time division multiple access (TDM) communication system. The method may include steps S100 and S200.

In step S100, at least one multiplexing node group in a subnet of the TDMA communication system is determined according to a connection relationship among all nodes in the subnet. A shortest communication link between every two nodes in each of the at least one multiplexing node group includes at least a preset quantity of nodes. The preset quantity of nodes includes said two nodes. The preset quantity is no less than 4.

The TDMA communication system may be a Long Term Evolution (LIE) system. The subnet may be a subnet of a MESH network, and the MESH network refers to a wireless mesh network.

The MESH network is an ad hoc network, and have characteristics of multi-hop, forwarding, and self-healing.

The step S100 in which the at least one multiplexing node group in the subnet of the TDMA communication system is determined according to the connection relationship of all nodes in the subnet of the time division multiple access may specifically include a following step.

The at least one multiplexing node group in the subnet is determined according to the connection relationship among all nodes in the subnet of the wireless mesh network of the LTE system.

Multiple separate network islands are generated to determine a network area and distinguish interfaces of nodes in the network area. The separate network islands are called subnets. Generally, different subnets are far from each other, and therefore nodes in different subnets may share a time slot directly. It is appreciated that all nodes in a network may share time slots through the method according to an embodiment of the present disclosure.

The connection relationship of each node may be obtained from a routing relationship table or a neighbor relationship table.

The preset quantity may be six.

Figure 2:
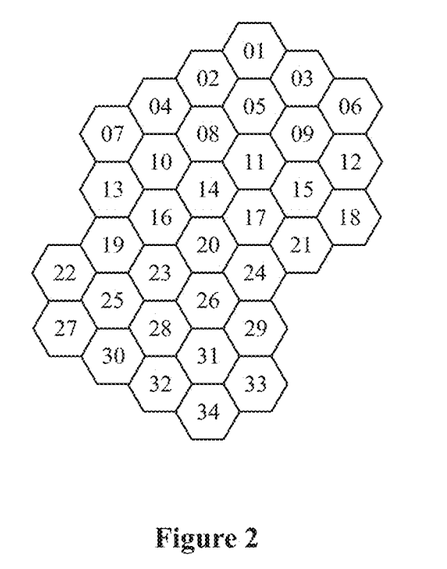
FIG. 2 is a schematic diagram of a cellular network according to an embodiment of the present disclosure.

In a case that two nodes are adjacent, the shortest communication link between the two nodes only includes such two nodes, and the two nodes communicate with each other directly. A distance between the two nodes increases as the preset quantity increases. As shown in FIG. 2, a cellular network is taken as an example for illustration. Each base station serves as a node, and it is assumed that node 01 is a first node and node 23 is a second node. The shortest communication link between the first node and the second node includes six nodes, for example, node 01-node 05-node 08-node 14-node 20-node 23, or, node 01-node 02-node 08-node 10-node 16-node 23.

The larger the distance between the nodes is, the greater the nodes are isolated in space. There is no co-channel interference in a case that the distance is large enough, and therefore time slots may be shared. Only a part of the nodes in the subnet are shown in FIG. 2, and the subnet may include more nodes. In such case, there are more nodes among which the distances are large, and thereby more nodes are capable to share the same time slot.

In a specific embodiment, determining the at least one multiplexing node group in the subnet of the TDMA communication system according to the connection relationship among all nodes in the subnet includes following steps.

For every two nodes, it is determined whether said two nodes are adjacent according to the connection relationship among all nodes in the subnet of the TDMA communication system. In a case that said two nodes are not adjacent, it is determined whether there is a duplicate node both adjacent to a node adjacent to one of said two nodes and adjacent to a node adjacent to another of said two nodes. In a case that there is no duplicate node, said two nodes are determined to be in one of the at least one multiplexing node group.

When the two nodes are not adjacent to each other and there is no duplicate node both adjacent to a node adjacent to one of said two nodes and adjacent to a node adjacent to another of said two nodes, it means that the two nodes are far from each other and can share a time slot. As shown in FIG. 2, node 01 is not adjacent to node 23. Nodes adjacent to the node 01 are nodes 02, 03, and 05, and nodes adjacent to the nodes adjacent to the node 01 are node 04, node 08, node 11, node 09, and node 06. Nodes adjacent to the node 23 are node 19, node 16, node 20, node 26, node 28, and node 25, and nodes adjacent to the nodes adjacent to the node 23 are node 13, node 10, node 11, node 14, node 17, node 24, node 29, node 31, node 32, node 30, node 27, and node 22. Hence, there is no duplicate node in both the nodes adjacent to the nodes adjacent to the node 01 and the nodes adjacent to the nodes adjacent to the node 23. The node 01 and the node 23 can share a time slot.

In step S200, for each of the at least one multiplexing node group, a multiplexing time slot allocated to said multiplexing node group is determined, and each node in said multiplexing node group is controlled to transmit data in the multiplexing time slot. Each node in said multiplexing node group is capable to transmit data at any moment in the multiplexing time slot.

In a specific embodiment, determining the multiplexing time slot allocated to said multiplexing node group may include following steps.

Time slots allocated to all nodes in said multiplexing node group are determined. A combination of all the determined time slots is determined to be the multiplexing time slot.

A corresponding time slot is allocated to each node in a conventional scheme for allocating time slots. Therefore, this embodiment of the present disclosure may be implemented on a basis of the conventional scheme for allocating time slots. First, a corresponding time slot is allocated to each node. Then, the time slots allocated to all nodes in a same multiplexing node group serve as the multiplexing time slot corresponding to the multiplexing node group. Each node in the multiplexing node group is controlled to transmit data in the corresponding multiplexing time slot.

For example, a multiplexing node group includes a first node, a second node, and a third node. The time slots allocated to the first node, the second node, and the third node are a first time slot, a second time slot, and a third time slot, respectively. Thereby, the multiplexing time slot includes such three time slots, and the three nodes can transmit data in such three time slots. Specifically, the first node is capable to transmit data in any one of the first time slot, the second time slot, and the third time slot. Similarly, the second node and the third node are capable to transmit data in any one of the first time slot, the second time slot, and the third time slot.

Figure 5:
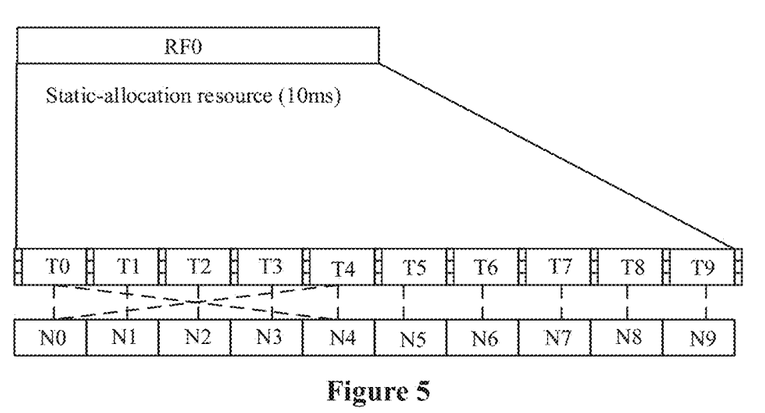
FIG. 5 is a schematic diagram of static allocation of time slots according to an embodiment of the present disclosure.

In a specific embodiment, a node in a multiplexing node group is capable to use the time slots allocated to each node in the multiplexing node group, when a solution according to the present disclosure is applied to static allocation. An example is shown in FIG. 5. Node N0 and node N4 are in a same multiplexing node group. In comparison with FIG. 3, the node N0 is capable to transmit data in 14 besides T0. Similarly, the node N4 is capable to transmit data in T0 besides T4.

Figure 6:
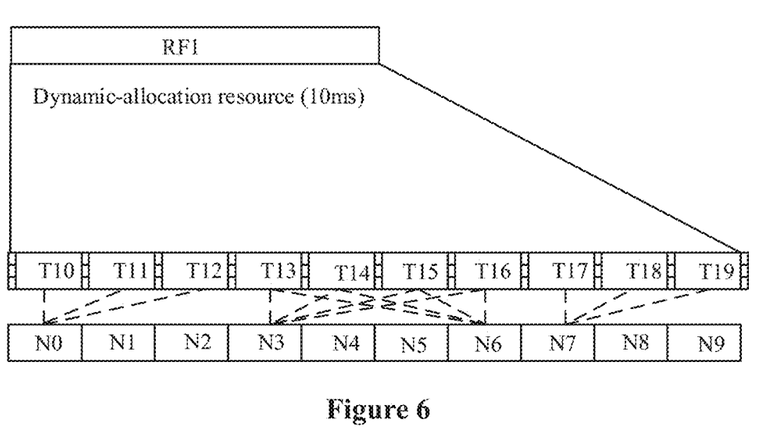
FIG. 6 is a schematic diagram of dynamic allocation of time slots according to an embodiment of the present disclosure.

In a specific embodiment, a node in a multiplexing node group is capable to use the time slots allocated to each node in the multiplexing node group, when a solution according to the present disclosure is applied to dynamic allocation. An example is shown in FIG. 6. Node N3 and node N6 are in a same multiplexing node group. In comparison with FIG. 4, the node N3 is capable to transmit data in T16, besides T3 to T15. Similarly, the node N6 is capable to transmit data in T13 to T15, besides T16. For example, the node N3 transmits data in T13, T14 and T15, and the node N6 transmits data in T14, T15 and T16.

The method for time slot multiplexing is provided according to embodiments of the present disclosure. The at least one multiplexing node group in the subnet of the TDMA communication system may be determined according to the connection relationship among all nodes in the subnet, where the shortest communication link between every two nodes in each of the at least one multiplexing node group includes at least the preset quantity of nodes, the preset quantity of nodes includes said two nodes, and the preset quantity is no less than 4. For each of the at least one multiplexing node group, the multiplexing time slot allocated to said multiplexing node group is determined, and each node in said multiplexing node group is controlled to transmit data in the multiplexing time slot, where each node in said multiplexing node group is capable to transmit data at any moment in the multiplexing time slot. The time slots can be shared by the nodes in the multiplexing node group, and therefore multiple nodes can transmit data in the multiplexing time slot. Resource utilization rate and spectral efficiency of the nodes are greatly improved. Further, the quantity of nodes is controlled in the shortest communication link between the nodes sharing a time slot, so that the time slot can only be shared when there is a long communication path between the two nodes. Thereby, signal interference among the nodes sharing the same time slot is reduced, ensuring an effect of communication.

Corresponding to the above-mentioned method embodiments, an apparatus for time slot multiplexing is further provided according to an embodiment of the present disclosure.

Figure 7:
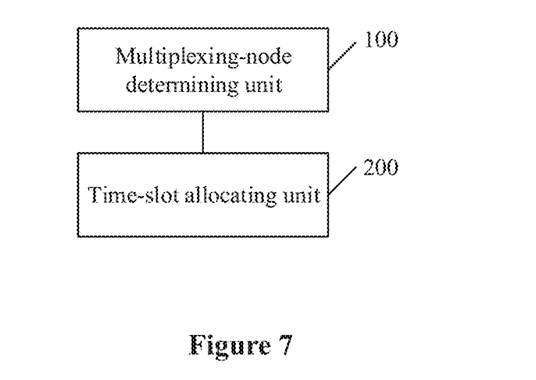
FIG. 7 is a schematic structural diagram of an apparatus for time slot multiplexing according to an embodiment of the present disclosure.

As shown in FIG. 7, an apparatus for time slot multiplexing is provided according to an embodiment of the present disclosure. The apparatus is applied to a time division multiple access communication (TDMA) system. The apparatus may include a multiplexing-node determining unit 100 and a time-slot allocating unit 200.

The multiplexing-node determining unit 100 is configured to determine at least one multiplexing node group in a subnet of the TDMA communication system, according to a connection relationship among all nodes in the subnet. A shortest communication link between every two nodes in each of the at least one multiplexing node group includes at least a preset quantity of nodes. The preset quantity of nodes includes said two nodes. The preset quantity is no less than 4

The TDMA communication system may be a Long Term Evolution (LTE) system. The subnet may be a subnet of a MESH network, and the MESH network refers to a wireless mesh network.

The MESH network is an ad hoc network, and have characteristics of multi-hop, forwarding, and self-healing.

The multiplexing node determining unit 100 may determine the at least one multiplexing node group in the subnet according to the connection relationship of all nodes in the subnet of the wireless mesh network of the LTE system.

The preset quantity may be six.

Multiple separate network islands are generated to determine a network area and distinguish interfaces of nodes in the network area. The separate network islands are called subnets. Generally, different subnets are far from each other, and therefore nodes in different subnets may share a time slot directly. It is appreciated that all nodes in a network may share time slots through the method according to an embodiment of the present disclosure.

The connection relationship of each node may be obtained from a routing relationship table or a neighbor relationship table.

The multiplexing-node determining unit 100 may include a first node determining unit and a second node determining unit.

The first node determining unit is configured to: for every two nodes, determine whether said two nodes are adjacent according to the connection relationship, and trigger the second node determining unit in response to said two nodes being not adjacent.

The second node determining unit is configured to: determine whether there is a duplicate node both adjacent to a node adjacent to one of said two nodes and adjacent to a node adjacent to another of said two node; and determine that said two nodes are in one of the at least one multiplexing node group, in response to there being no duplicate node. The shortest communication link between every two nodes in each of the at least one multiplexing node group includes at least the preset quantity of nodes, and the preset quantity of nodes includes said two nodes.

In a case that two nodes are adjacent, the shortest communication link between the two nodes only includes such two nodes, and the two nodes communicate with each other directly. The larger the distance between the nodes is, the greater the nodes are isolated in space. There is no co-channel interference in a case that the distance is large enough, and therefore time slots may be shared.

The time slot allocation unit 200 may be configured to, for each of the at least one multiplexing node group, determine a multiplexing time slot allocated to said multiplexing node group, and control each node in said multiplexing node group to transmit data in the multiplexing time slot. Each node in said multiplexing node group is capable to transmit data at any moment in the multiplexing time slot.

The time slot allocation unit 200 may be specifically configured to, for each of the at least one multiplexing node group: determine time slots allocated to all nodes in said multiplexing node group; determine a combination of all the determined time slots to be the multiplexing time slot; and control each node in said multiplexing node group to transmit data in the multiplexing time slot. Each node in said multiplexing node group is capable to transmit data at any moment in the multiplexing time slot.

A corresponding time slot is allocated to each node in a conventional scheme for allocating time slots. Therefore, this embodiment of the present disclosure may be implemented on a basis of the conventional scheme for allocating time slots. First, a corresponding time slot is allocated to each node. Then, the time slots allocated to all nodes in a same multiplexing node group serve as the multiplexing time slot corresponding to the multiplexing node group. Each node in the multiplexing node group is controlled to transmit data in the corresponding multiplexing time slot.

The apparatus for time slot multiplexing is provided according to embodiments of the present disclosure. The at least one multiplexing node group in the subnet of the TDMA communication system may be determined according to the connection relationship among all nodes in the subnet, where the shortest communication link between every two nodes in each of the at least one multiplexing node group includes at least the preset quantity of nodes, the preset quantity of nodes includes said two nodes, and the preset quantity is no less than 4. For each of the at least one multiplexing node group, the multiplexing time slot allocated to said multiplexing node group is determined, and each node in said multiplexing node group is controlled to transmit data in the multiplexing time slot, where each node in said multiplexing node group is capable to transmit data at any moment in the multiplexing time slot. The time slots can be shared by the nodes in the multiplexing node group, and therefore multiple nodes can transmit data in the multiplexing time slot. Resource utilization rate and spectral efficiency of the nodes are greatly improved. Further, the quantity of nodes is controlled in the shortest communication link between the nodes sharing a time slot, so that the time slot can only be shared when there is a long communication path between the two nodes. Thereby, signal interference among the nodes sharing the same time slot is reduced, ensuring an effect of communication.

Corresponding to the above-mentioned method embodiments and apparatus embodiments, a communication device is further provided according to an embodiment of the present disclosure.

Figure 8:
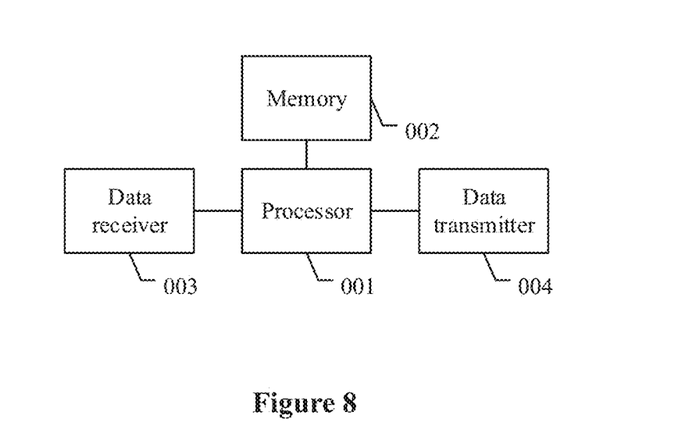
FIG. 8 is a schematic structural diagram of a communication device according to an embodiment of the present disclosure.

As shown in FIG. 8, a communication device is provided according to an embodiment of the present disclosure. The communication device is located in a time division multiple access (TDMA) communication system.

The communication device may include a processor 001, a memory 002, a data receiver 003, and a data transmitter 004.

The data receiver 003 is coupled to the processor 001, and is configured to receive data transmitted in a communication link of the TDMA communication system.

The data transmitter 004 is coupled to the processor 001, and is configured to transmit data to the communication link of the TDMA communication system.

The memory 002 is coupled to the processor 001, and is configured to store a program and data generated when the program being executed.

The processor 001 when executing the program in the memory is configured to perform following functions.

At least one multiplexing node group in a subnet of the TDMA communication system is determined according to a connection relationship among all nodes in the subnet. A shortest communication link between every two nodes in each of the at least one multiplexing node group includes at least a preset quantity of nodes. The preset quantity of nodes includes said two nodes. The preset quantity is no less than 4.

For each of the at least one multiplexing node group, a multiplexing time slot allocated to said multiplexing node group is determined, and each node in said multiplexing node group is controlled to transmit data in the multiplexing time slot. Each node in said multiplexing node group is capable to transmit data at any moment in the multiplexing time slot.

In a specific embodiment, the processor 001 may determine, for every two nodes, whether said two nodes are adjacent according to the connection relationship among all nodes in the subnet of the time division multiple access communication system. The processor 001 may determine whether there is a duplicate node both adjacent to a node adjacent to one of said two nodes and adjacent to a node adjacent to another of said two nodes, in a case that the two nodes are not adjacent. The processor 001 may determine said two nodes are in one of the at least one multiplexing node group, in case that there is no duplicate node.

The processor 001 may determine time slots allocated to all nodes in said multiplexing node group, and determine a combination of all the determined time slots to be the multiplexing time slot.

The communication device is provided according to embodiments of the present disclosure. The at least one multiplexing node group in the subnet of the TDMA communication system may be determined according to the connection relationship among all nodes in the subnet, where the shortest communication link between every two nodes in each of the at least one multiplexing node group includes at least the preset quantity of nodes, the preset quantity of nodes includes said two nodes, and the preset quantity is no less than 4. For each of the at least one multiplexing node group, the multiplexing time slot allocated to said multiplexing node group is determined, and each node in said multiplexing node group is controlled to transmit data in the multiplexing time slot, where each node in said multiplexing node group is capable to transmit data at any moment in the multiplexing time slot. The time slots can be shared by the nodes in the multiplexing node group, and therefore multiple nodes can transmit data in the multiplexing time slot. Resource utilization rate and spectral efficiency of the nodes are greatly improved. Further, the quantity of nodes is controlled in the shortest communication link between the nodes sharing a time slot, so that the time slot can only be shared when there is a long communication path between the two nodes. Thereby, signal interference among the nodes sharing the same time slot is reduced, ensuring an effect of communication.

The apparatus for time slot multiplexing includes a processor and a memory. The multiplexing node determining unit, the time slot allocating unit, and the like may be stored in the memory as program units. The processor executes the program units stored in the memory to perform the corresponding functions.

The processor includes a core that invokes corresponding program elements from the memory. There may be one or more cores, and a parameter of the one or more cores are adjusted to implement time slot multiplexing.

The memory may include a computer readable medium, for example, a volatile memory, a random-access memory (RAM), and/or a non-volatile memory such as read only memory (ROM) or flash RAM. The memory includes at least one memory chip.

A storage medium is further provided according to an embodiment of the present disclosure. The storage medium stores a program, and the program when executed by a processor implements the method for time slot multiplexing.

A processor is further provided according to an embodiment of the present disclosure. The processor is configured to run a program, and the program when executed implements the method for time slot multiplexing.

An equipment is provided according to an embodiment of the present disclosure. The equipment includes a processor, a memory, and a program that is stored in the memory and executable by the processor. The processor when executing the program implements following steps.

At least one multiplexing node group in a subnet of the TDMA communication system is determined according to a connection relationship among all nodes in the subnet. A shortest communication link between every two nodes in each of the at least one multiplexing node group includes at least a preset quantity of nodes. The preset quantity of nodes includes said two nodes. The preset quantity is no less than 4.

For each of the at least one multiplexing node group, a multiplexing time slot allocated to said multiplexing node group is determined, and each node in said multiplexing node group is controlled to transmit data in the multiplexing time slot. Each node in said multiplexing node group is capable to transmit data at any moment in the multiplexing time slot.

The equipment herein may be a server, a PC, a PAD, a mobile phone, or the like.

A computer program product is further provided according to an embodiment of the present disclosure. The computer program product when operated by a data processing device is configured to execute and initialize a program including following method steps.

At least one multiplexing node group in a subnet of the TDMA communication system is determined according to a connection relationship among all nodes in the subnet. A shortest communication link between every two nodes in each of the at least one multiplexing node group includes at least a preset quantity of nodes. The preset quantity of nodes includes said two nodes. The preset quantity is no less than 4.

For each of the at least one multiplexing node group, a multiplexing time slot allocated to said multiplexing node group is determined, and each node in said multiplexing node group is controlled to transmit data in the multiplexing time slot. Each node in said multiplexing node group is capable to transmit data at any moment in the multiplexing time slot.

Those skilled in the art should appreciate that embodiments of the present disclosure may be provided in a form of a method, a system, or a computer program product. Thus, the present disclosure may be implemented in a form of a total-hardware embodiment, a total-software embodiment, or an embodiment incorporating both software and hardware aspects. In addition, the present disclosure may be embodied as a computer program product implemented on one or more computer-usable storage media (including but not limited to, a magnetic disk memory, a CD-ROM, an optical memory, or the like) that store computer-usable program codes.

The present disclosure is described with reference to flow charts and/or block diagrams of methods, devices (systems), and computer program products according to embodiments of the present disclosure. Each flow and/or each block in the flow charts and/or block diagrams, and a combination of flows and/or blocks in the flow charts and/or block diagrams, may be implemented as computer program instructions. A machine may be produced by providing the computer program instructions to a processor of a general-purpose computer, a special purpose computer, an embedded processing machine, or other programmable data processing devices. Thereby, the instructions executed by the processor of the computer or other programmable data processing device produce an apparatus for implementing the functions specified in one or more flows in a flow chart, and/or one or more blocks in a block diagram.

These computer program instructions may also be stored in a computer-readable memory capable of directing a computer or other programmable data processing devices to operate in a particular manner. Thereby, the instructions stored in the computer-readable memory produce an article of manufacture including an apparatus of instructions, and the apparatus of instructions implements the functions specified in one or more flows in a flow chart, and/or one or more blocks in a block diagram.

These computer program instructions may also be loaded onto a computer or other programmable data processing devices, such that a series of operational steps are performed on the computer or other programmable devices to produce a computer-implemented process. Thereby, the instructions executed on the computer or other programmable devices provide steps for implementing the functions specified in one or more flows in a flow chart, and/or one or more blocks in a block diagram.

In a typical configuration, the computing device includes one or more processors (CUs), an input/output interface, a network interface, and a memory.

The memory may include a computer readable medium, for example, a volatile memory, a random-access memory (RAM), and/or a non-volatile memory such as read only memory (ROM) or flash RAM. Such memories are examples of the computer readable medium.

The computer readable medium includes non-volatile and volatile, removable and non-removable media, and may implement storage of information through any method or technique. The information may be computer readable instructions, data structures, modules of a program, or other types of data. Examples of storage medium of a computer include, but are not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory techniques, a read-only optical disk (CD-ROM), a digital versatile disk (DVD) or other optical storage, a magnetic cassette, a memory of a magnetic tape or a magnetic disk or other magnetic storage devices, or any other non-transmission medium, which is capable to store information accessible by a computing device. As defined herein, a computer-readable medium does not include a transitory computer-readable medium, such as a modulated data signal and a carrier wave.

Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including . . . " does not exclude the case that other similar elements may exist in the process, the method, the article or the device other than enumerated elements.

Those skilled in the art should appreciate that embodiments of the present disclosure may be provided in a form of a method, a system, or a computer program product. Thus, the present disclosure may be implemented in a form of a total-hardware embodiment, a total-software embodiment, or an embodiment incorporating both software and hardware aspects. In addition, the present disclosure may be embodied as a computer program product implemented on one or more computer-usable storage media (including but not limited to, a magnetic disk memory, a CD-ROM, an optical memory, or the like) that store computer-usable program codes.

Described above are embodiments of the present disclosure, which is not intended to limit the present disclosure. Various modifications and variations may be made by those skilled in the art. Any modification, equivalent, improvement, and the like that is made within the spirit and principles of the present disclosure should fall within the scope of the claims of the present disclosure.

The invention claimed is:

1. A method for time slot multiplexing applied to a time division multiple access (TDMA) communication system, comprising:
   determining at least one multiplexing node group in a subnet of the TDMA communication system, according to a connection relationship among all nodes in the subnet, wherein a shortest communication link between every two nodes in each of the at least one multiplexing node group comprises at least a preset quantity of nodes, the preset quantity of nodes comprises said two nodes, and the preset quantity is no less than 4; and
   for each of the at least one multiplexing node group,
   determining a multiplexing time slot allocated to said multiplexing node group, and
   controlling each node in said multiplexing node group to transmit data in the multiplexing time slot,
   wherein each node in said multiplexing node group is capable to transmit data at any moment in the multiplexing time slot;
   wherein determining the at least one multiplexing node group in the subnet of the TDMA communication system according to the connection relationship among all nodes in the subnet comprises:
   for every two nodes,
   determining whether said two nodes are adjacent according to the connection relationship among all nodes in the subnet of the TDMA communication system;
   determining whether there is a duplicate node both adjacent to a node adjacent to one of said two nodes and adjacent to a node adjacent to another of said two nodes, in response to said two nodes being not adjacent; and
   determining said two nodes are in one of the at least one multiplexing node group, in response to there being no duplicate node.

2. The method according to claim 1, wherein the preset quantity is 6.

3. The method according to claim 2, wherein determining the multiplexing time slot allocated to said multiplexing node group comprises:
   determining time slots allocated to all nodes in said multiplexing node group; and
   determining a combination of all the determined time slots to be the multiplexing time slot.

4. The method according to claim 1, wherein:
   the TDMA communication system is a Long Term Evolution (LTE) system; and
   determining the at least one multiplexing node group in the subnet of the TDMA communication system according to the connection relationship among all nodes in the subnet comprises:
   determining the at least one multiplexing node group in the subnet, according to the connection relationship among all nodes in the subnet of a wireless mesh network of the LTE system.

5. The method according to claim 4, wherein determining the multiplexing time slot allocated to said multiplexing node group comprises:
   determining time slots allocated to all nodes in said multiplexing node group; and
   determining a combination of all the determined time slots to be the multiplexing time slot.

6. The method according to claim 1, wherein determining the multiplexing time slot allocated to said multiplexing node group comprises:
   determining time slots allocated to all nodes in said multiplexing node group; and
   determining a combination of all the determined time slots to be the multiplexing time slot.

7. The method according to claim 1, wherein determining the multiplexing time slot allocated to said multiplexing node group comprises:
   determining time slots allocated to all nodes in said multiplexing node group; and
   determining a combination of all the determined time slots to be the multiplexing time slot.

8. A communication device located in a time division multiple access communication (TDMA) system, comprising a processor, a memory, a data receiver, and a data transmitter, wherein:
   the data receiver is coupled to the processor, and is configured to receive data transmitted in a communication link of the TDMA communication system;
   the data transmitter is coupled to the processor, and is configured to transmit data to the communication link of the TDMA communication system;
   the memory is coupled to the processor, and is configured to store a program and data generated when the program being executed; and
   the processor when executing the program in the memory is configured to:
   determine at least one multiplexing node group in a subnet of the TDMA communication system, according to a connection relationship among all nodes in the subnet, wherein a shortest communication link between every two nodes in each of the at least one multiplexing node group includes at least a preset quantity of nodes, the preset quantity of nodes includes said two nodes, and the preset quantity is no less than 4; and
   for each of the at least one multiplexing node group,
   determine a multiplexing time slot allocated to said multiplexing node group, and
   control each node in said multiplexing node group to transmit data in the multiplexing time slot,
   wherein each node in said multiplexing node group is capable to transmit data at any moment in the multiplexing time slot;
   wherein for every two nodes, the processor when executing the program in the memory is configured to:
   determine whether said two nodes are adjacent according to the connection relationship among all nodes in the subnet of the TDMA communication system;
   determine whether there is a duplicate node both adjacent to a node adjacent to one of said two nodes and adjacent to a node adjacent to another of said two nodes, in response to the two nodes being not adjacent; and determine said two nodes are in one of the at least one multiplexing node group, in response to there being no duplicate node.

9. The communication device according to claim 8, wherein the processor when executing the program in the memory is configured to:
   determine time slots allocated to all nodes in said multiplexing node group, and
   determine a combination of all the determined time slots to be the multiplexing time slot.

10. The communication device according to claim 8, wherein the processor when executing the program in the memory is configured to:
    determine time slots allocated to all nodes in said multiplexing node group, and
    determine a combination of all the determined time slots to be the multiplexing time slot.

11. The communication device according to claim 8, wherein the preset quantity is 6.

12. The communication device according to claim 8, wherein:
    the TDMA communication system is a Long Term Evolution (LTE) system; and
    the processor when executing the program in the memory is configured to determine the at least one multiplexing node group in the subnet, according to the connection relationship among all nodes in the subnet of a wireless mesh network of the LTE system.

\* \* \* \* \*